United States Patent [19]

Allen

[11] 4,071,458

[45] Jan. 31, 1978

[54] OIL DISPLACEMENT FLUID CONTAINING A SOLUBILIZING AGENT

[75] Inventor: Joseph C. Allen, Bellaire, Tex.

[73] Assignee: Texaco Inc., New York, N.Y.

[21] Appl. No.: 724,184

[22] Filed: Sept. 17, 1976

Related U.S. Application Data

[60] Continuation-in-part of Ser. No. 645,185, Dec. 29, 1975, abandoned, which is a division of Ser. No. 560,425, March 20, 1975, abandoned.

[51] Int. Cl.$^2$ .................. E21B 43/22; E21B 43/24
[52] U.S. Cl. .................. 252/8.55 D; 166/272; 166/274; 260/288 R
[58] Field of Search ............ 252/8.55 D; 260/288 R; 166/272, 274

[56] References Cited

U.S. PATENT DOCUMENTS

| | | | |
|---|---|---|---|
| 1,970,578 | 8/1934 | Scholler | 252/89 X |
| 3,731,741 | 5/1973 | Palmer et al. | 166/272 |
| 3,796,262 | 3/1974 | Allen et al. | 166/272 |
| 3,838,738 | 10/1974 | Redford et al. | 166/272 X |
| 3,913,672 | 10/1975 | Allen et al. | 166/263 |

*Primary Examiner*—Herbert B. Guynn
*Attorney, Agent, or Firm*—Carl G. Ries; Thomas H. Whaley; Walter D. Hunter

[57] ABSTRACT

Petroleum may be recovered from viscous petroleum containing formations including tar sand deposits by first creating a fluid communication path in the formation, followed by injecting via an injection well an aromatic solvent such as benzene, saturated with carbon dioxide at the injection pressure into the fluid communication path, following the injection of the solvent with the injection of an oil-displacing fluid such as hot water, steam, or superheated steam and recovering oil from the formation via a production well. The oil displacing fluid may contain a solubilizing agent such as an oxyethylated nitrogen containing compound.

6 Claims, No Drawings

OIL DISPLACEMENT FLUID CONTAINING A SOLUBILIZING AGENT

This application is a continuation-in-part of application Ser. No. 645,185 filed Dec. 29, 1975 which in turn is a division of application Ser. No. 560,425, filed Mar. 20, 1975, both now abandoned.

BACKGROUND OF THE INVENTION

1. Field of the Invention

This invention pertains to an oil recovery method, and more specifically to a method for recovering oil or petroleum from a subterranean viscous petroleum containing formation such as a tar sand deposit.

2. Description of the Prior Art

There are known to exist throughout the world many subterranean petroleum containing fromations from which the petroleum cannot be recovered by conventional means because of the relatively high viscosity thereof. The best known of such viscous petroleum containing formations are the so-called tar sands or bituminous sand deposits. The largest and most famous such deposit is in the Athabasca area in the northeastern part of the province of Alberta, Canada which is known to contain over 700 billion barrels of petroleum. Other extensive deposits are known to exist in western part of the United States, and Venezuela, and lesser deposits in Europe and Asia.

Tar sands are frequently defined as sand saturated with a highly viscous crude petroleum material not recoverable in its natural state through a well by ordinary production methods. The hydrocarbon contained in tar sand deposits are generally highly bituminous in character. The tar sand deposits are generally arranged as follows. Fine quartz sand is coated with a layer of water and the bituminous material occupies most of the void space around the wetted sand grains. The balance of the void volume may be filled with connate water, and occasionally a small volume of gas which is usually air or methane. The sand grains are packed to a void volume of about 35%, which corresponds to about 83% by weight sand. The balance of the material is bitumen and water. The sum of bitumen and water will almost always equal about 17% by weight, with the bitumen portion varying from around 2% to around 16%.

It is an unusual characteristic of tar sand deposits that the sand grains are not in any sense consolidated, that is to say the sand is essentially suspended in the solid or nearly solid hydrocarbon material. The API gravity of the bitumen usually ranges from about 6 to about 8, and the specific gravity at 60° F. is from about 1.006 to about 1.027. Approximately 50% of the bitumen is distillable without cracking, and the sulfur content averages between 4 and 5% by weight. The bitumen is also very viscous, and so even if it is recoverable by an in situ separation technique, some on-site refining of the produced petroleum must be undertaken in order to convert it to a pumpable fluid.

Bitumen may be recovered from tar sand deposits by mining or by in situ processes. Most of the recovery to date has been by means of mining, although this is limited to instances where the ratio of the overburden thickness to tar sand deposit thickness is economically suitable, generally defined as one or less. In situ processes have been proposed which may be categorized as thermal, such as fire flooding or steam injection, and steam plus emulsification drive processes. Generation of thermal heat necessary to mobilize the bitumen by means of a subterranean atomic explosion has been seriously considered, although has not yet been attempted.

Despite the many proposed methods for recovering bitumen from tar sand deposits, there has still been no successful exploitation of such deposits by in situ processing on a commercial scale up to the present time. Accordingly, in view of the lack of commercial success of any of the methods proposed to date, and especially in view of the enormous reserves present in this form which are needed to help satisfy present energy needs, there is a substantial need for a satisfactory method for recovery of bitumen from tar sand deposits.

SUMMARY OF THE INVENTION

In its broadest aspect this invention is a method for recovering petroleum from subterranean, viscous petroleum containing formations including tar sand deposits, said formations being penetrated by at least one injection well and by at least one production well, comprising:

a. establishing a fluid communication path in the formation between the injection well and the production well;

b. injecting via an injection well a slug of an aromatic hydrocarbon solvent saturated at pressures ranging from about 100 to about 1,000 psi with a material selected from the group consisting of carbon dioxide, a gaseous hydrocarbon and mixtures thereof into the communication path;

c. injecting via the said injection well an oil-displacing fluid selected from the group consisting of hot water, steam and superheated steam; and d. recovering petroleum from the formation via the production well.

DETAILED DESCRIPTION OF THE INVENTION

In the first step of this process a communication path is established in the formation. The ideal communication path is an essentially horizontal, pancake shaped zone of high permeability preferably at or near the bottom of the tar sand or petroleum reservoir.

It is sometimes discovered that there is a water saturated zone in the very bottom of the petroleum reservoir, and this may be utilized successfully to establish the fluid communication path in accordance with our process. The water saturated zone may be opened up by injecting into the zone a heated fluid such as steam, which will channel preferentially through this water saturated zone to the production well. Asphaltic or other solid or semisolid hydrocarbon materials present in the water saturated zone will be melted and rendered mobile, and the permeability will be opened up considerably thereby.

Generally, it will be necessary to open up the communication path through the formation by some other means such as hydraulic fracturing. Hydraulic fracturing is a well known technique for establishing a communication path between an injection well and a production well. Fracturing is usually accomplished by forcing a liquid such as water, oil or any other suitable hydrocarbon fraction into the formation at pressures of from about 300 to about 1,500 psig which are sufficient to rupture the formation and to open up channels therein. By use of this method it is possible to position the fracture at any desired vertical location with respect to the bottom of the oil filled zone. It is not essential that the fracture planes be horizontally oriented, although it is of course preferable that they be.

In any event, a communication path of some sort is created, generally confined to the lower portion of the petroleum reservoir. After the fracture has been established, and without diminishing the fracture pressure, a propping agent may be injected into the fracture in order to prevent healing of the fracture which would destroy its usefulness for fluid flow communication purposes. Gravel and sand or mixtures thereof are employed as propping agents, and it is desirable in the instance of tar sand deposits that a wide variation of particle sizes be employed to avoid flowing of the tar sand materials back into the propped fracture zone.

In the next step of the process of this invention an aromatic solvent saturated at pressures ranging from about 100 psi to about 1,000 psi with a material selected from the group consisting of carbon dioxide, gaseous hydrocarbons and mixtures thereof is injected into the communication path previously formed in the formation. Generally, the injection pressure will vary from about 300 to about 1,500 psig or more.

A wide variety of aromatic hydrocarbon solvents in liquid form may be utilized in this step such as benzene, toluene, xylene, etc. Preferably, the aromatic hydrocarbon solvent in liquid phase is saturated with carbon dioxide or a mixture at least in part composed of carbon dioxide. Any normal gaseous hydrocarbon such as methane, ethane, propane, butane, pentane, hexane and natural gas may likewise be employed in forming the saturated liquid aromatic hydrocarbon solvent solution. The temperature of the gas-saturated aromatic hydrocarbon solvent injected into the communication path can likewise be varied over a wide-range and generally will be from about $-10°$ to about $50°$ C. and preferably from about $20°$ to about $40°$ C.

The quantity of the gas-saturated solvent employed will generally be from about 0.01 to about 0.10 pore volumes or more. Prior to the introduction of the gas-saturated, aromatic hydrocarbon solvent the formation may be heated if desired by forcing a heating fluid which can be for example, hot water or steam through the communication path in the formation.

After the aromatic hydrocarbon solvent saturated with carbon dioxide and/or other gaseous hydrocarbons has been forced into the formation via an injection well, an oil-displacing fluid which is selected from the group consisting of water, steam, and superheated steam is injected into the formation via the communication path. If water is employed, the preferred temperature will range from about $100°$ to about $300°$ C. Saturated and superheated steam pressures will range from about 100 to 1,000 psi or more.

If desired, the aqueous flooding fluid, that is the oil-displacing fluid, employed may comprise an alkaline oil-displacing fluid or an alkaline oil-displacing fluid containing a minor amount of a solubilizing agent. The advantageous results achieved with the aqueous alkaline flooding medium used in the process of this invention are believed to be derived from the wetability improving characteristics of the alkaline agent and when the solubilizing agent is employed it is believed that the advantageous results are derived from the solubilizing action on the crude oil such as in tar sands and other formations and especially on the asphaltene fractions. The solubilizing agent is believed to be effective in releasing the crude from the pore surface or sand surfaces as the case may be so that the surface can be exposed to the alkaline agent.

Useful alkaline agents include compounds selected from the group consisting of an alkali metal hydroxide, an alkaline earth metal hydroxide, and a basic salt of the alkali metal or alkaline earth metals which is capable of hydrolyzing in an aqueous medium to give an alkaline solution, a concentration of the alkaline agent being about 0.001 to 0.5 molar to give the required alkaline solution. Also, alkaline materials such as sodium hypochlorite are highly effective as alkaline agents. Examples of these especially useful alkaline agents include sodium hydroxide, potassium hydroxide, lithium hydroxide, ammonium hydroxide, sodium hypochlorite, sodium carbonate, and potassium carbonate.

A wide variety of the solubilizing agents are useful in the process of this invention including water-soluble, oxyalkylated nitrogen-containing aromatic compounds where preferably the initiator, i.e., the aromatic compound contains not more than 12 carbon atoms and the number of oxyalkyl units is about 5 to about 50. One especially useful group of the water-soluble, oxyalkylated, nitrogen-containing aromatic compound are those having the formula:

R (OR')$_n$OH, wherein R is selected from the group consisting of:

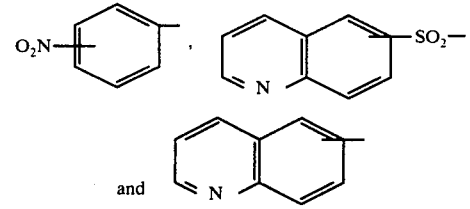

wherein R' is alkylene of from 2 to 4 inclusive carbon atoms and $n$ is an integer of from about 5 to about 50 and preferably from about 5 to about 20. These novel-soluble-water oxyalkylated products can be conveniently prepared by a number of processes well-known in the art and their preparation is more completely described in U.S. Pat. No. 3,731,741 which is incorporated herein by reference in its entirety.

Another group of solubilizing agents which are highly useful in the process of this invention include compounds of the formula:

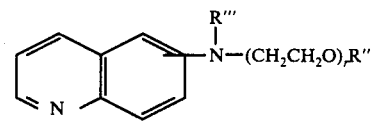

wherein $r$ is an integer from about 5 to about 50 or more and preferably from about 5 to about 15, R" is selected from the group consisting of hydrogen and —SO$_3$ M wherein M is selected from the group consisting of sodium, potassium and the ammonium ion and wherein R''' is selected from the group consisting of hydrogen and —(CH$_2$CH$_2$O)$_r$R" where $r$ and R" have the same meaning as previously described. Solubilizing agents of this type where R" is hydrogen can be formed by reacting ethylene oxide with an aminoquinoline 5-aminoquinoline, 6-aminoquinoline, 7-aminoquinoline, etc. in the presence of a catalyst such as solid sodium hydroxide. The quinoline starting material may also be substituted by other innocuous groups such as alkoxy of from 1 to 4 carbon atoms, alkyl, etc. The corresponding sulfated compounds can be prepared by reacting the hydroxyl terminated derivatives described above with sulfuric acid followed by neutralization if desired.

EXAMPLE I

This invention is best understood by a reference to the following example, which is offered only as an illustrative embodiment of our invention, and is not intended to be limitative or restricted thereof.

A tar sand deposit is located at a depth of 450 feet and it is determined that the thickness of the formation is 65 feet. It is also determined that the petroleum is in the form of a highly bituminous hydrocarbon, and its viscosity at the formation temperature is much too high to permit recovery thereof by conventional means. An injection well is drilled to the bottom of the formation, and perforations are formed between the interval of 490–515 feet, i.e., the bottom of the petroleum saturated zone. A production well is drilled approximately 330 feet distance from the injection well, and perforations are similarly made slightly above the bottom of the petroleum saturated zone. The production well is also equipped with a steam trap so that only liquids can be produced from the formation, and vapors are excluded therefrom.

A fluid communication path low in the formation is formulated by fracturing the formation using conventional hydrualic fracturing techniques, and injecting a gravel sand mixture into the fracture to hold it open and prevent healing of the fracture.

Following the fracturing operation, the formation optionally may be heated by injecting hot water at a temperature of 205° F. into the formation and continuing the injection until the temperature of the water produced at the production well rises to about 195° F., indicating that the communication path is open and is heated uniformly between the two wells.

In the next step 2,500 barrels of benzene saturated with carbon dioxide at a temperature 60° F. and 500 psig is injected into the formation at this same pressure and at a rate of 10 barrels per minute. After the benzene saturated with carbon dioxide is injected via the production well into the formation, the injection of 80% quality steam at a temperature of 417° F. and a pressure of 285 psig is commenced at the rate of 15,000 pounds per hour. The production of viscous oil via the production well gradually increases as injection of the oil-displacing fluid is continued and at the end of 30 days production of the viscous hydrocarbons is significantly increased over production of similar wells in the same formation utilizing only steam injection.

EXAMPLE II

In this example viscous oil is recovered from a tar sand at a depth of 730 feet and having a thickness of about 28 feet. An injection well is drilled to the bottom of the hydrocarbon bearing structure and the casing perforated in the interval 735 to 745 feet. In a like manner a production well drilled at a distance of about 400 feet from the injection well is perforated at a depth of 730–740 feet, i.e., the center of the tar sand formation at that location.

In the next step a fluid communication path is formed by fracturing the formation in both wells using conventional hydraulic fracturing technique. A gravel-sand mixture is injected into the formation to hold it open and to prevent healing of the fracture. A total of 3,400 barrels of toluene saturated with carbon dioxide at a temperature of 60° F. and a pressure of 500 psig is injected into the formation at the same pressure and at a rate of 10 barrels per minute. Following the injection of the carbon dioxide saturated toluene, the injection of superheated steam (temperature 600° F, pressure 300 psig) containing about 0.01 percent by weight of a solubilizing agent of the formula:

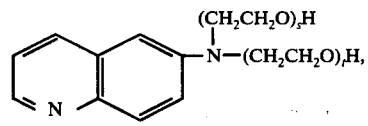

where $s$ plus $t$ is about 14, is commenced at the rate of 13,000 pounds per hour. Production of viscous oil from the production well is continued and at the end of 12 days the rate of production is substantially greater than with steam injection alone.

EXAMPLE III

A test identical to that described in Example I is conducted with the exception that the steam injected contains about 0.006 weight percent of a solubilizing agent of the formula:

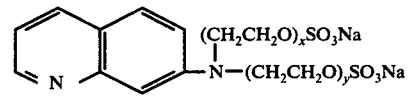

where $x$ plus $y$ is about 12. At the end of 40 days of steam injection the production of viscous hydrocarbons is significantly increased over production of similar wells in the same formation employing only steam injection.

What is claimed is:

1. An oil-displacement fluid which comprises a material selected from the group consisting of water, steam and superheated steam together with a minor amount of a solubilizing agent of the formula:

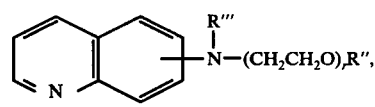

wherein $r$ is an integer of from about 5 to about 50; R″ is selected from the group consisting of hydrogen and —$SO_3M$ wherein M is selected from the group consisting of hydrogen, sodium, potassium, and the ammonium ion and R‴ is selected from the group consisting of hydrogen and —$(CH_2CH_2O)_rR″$ and with the proviso that when R″ is hydrogen then R‴ is —$(CH_2CH_2O)_rH$; and wherein the said solubilizing agent is present in amount of from 0.001 to 0.05 weight percent.

2. The oil-displacement fluid of claim 1 wherein the said solubilizing agent has the formula:

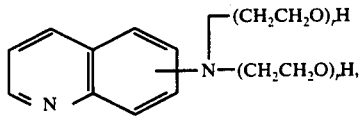

wherein $r$ is an integer of from about 5 to about 50.

3. The oil-displacement fluid of claim 1 wherein the said solubilizing agent has the formula:

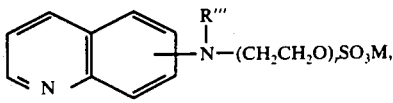

wherein $r$ is an integer of from about 5 to about 50, M is selected from the group consisting of hydrogen, sodium, potassium, and the ammonium ion and R''' is selected from the group consisting of hydrogen and $-(CH_2CH_2O)_rSO_3M$, wherein $r$ and M have the same meaning as previously described.

4. The oil-displacement fluid of claim 1 wherein an alkaline agent selected from the group consisting of sodium hydroxide and sodium hypochlorite is included therein.

5. The oil-displacement fluid of claim 4 wherein the said alkaline agent is sodium hydroxide.

6. The oil-displacement fluid of claim 4 wherein the said alkaline agent is sodium hypochlorite.

* * * * *